(No Model.) 6 Sheets—Sheet 1.
A. O. DAVID.
MANUFACTURE OF WELDLESS CHAINS.
No. 335,899. Patented Feb. 9, 1886.
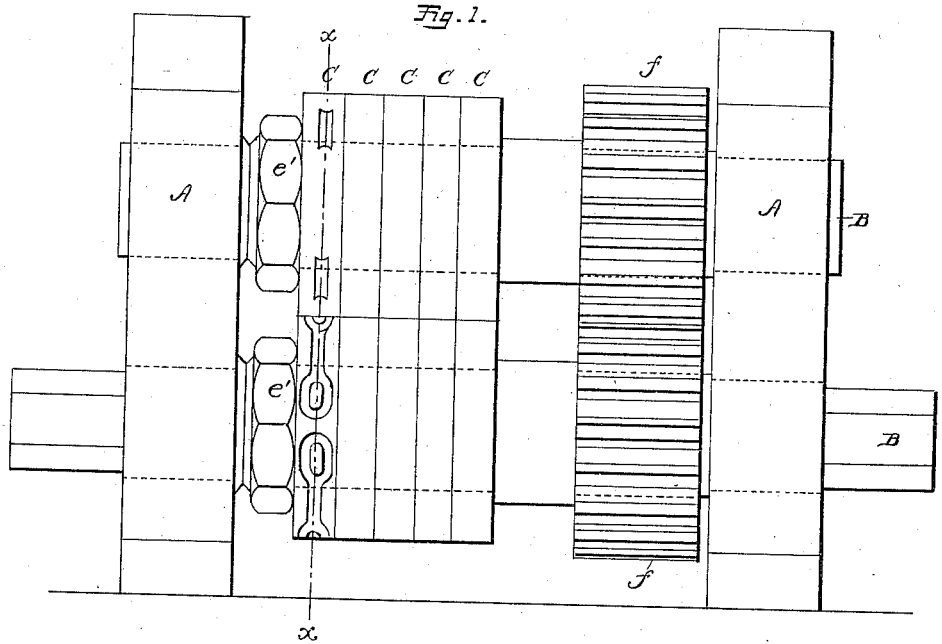
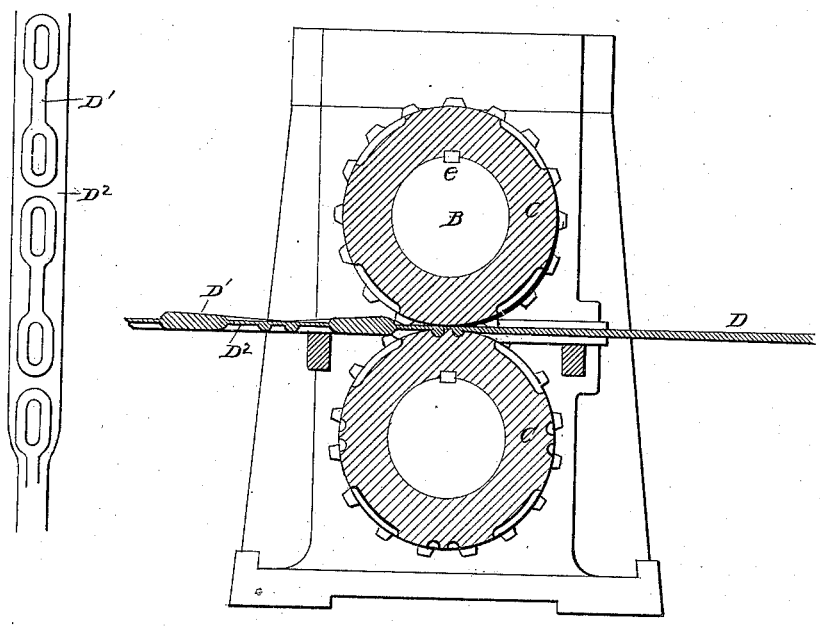
WITNESSES
W. N. Mortimer
H. F. Riley
INVENTOR
Augustin O. David,
by R. G. Dyrenforth,
his Attorney (No Model.) 6 Sheets—Sheet 2.
A. O. DAVID.
MANUFACTURE OF WELDLESS CHAINS.
No. 335,899. Patented Feb. 9, 1886.
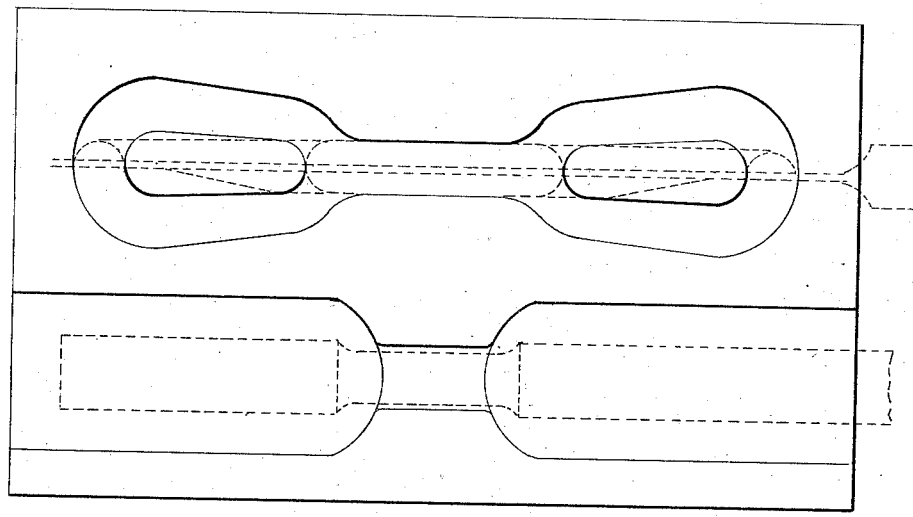
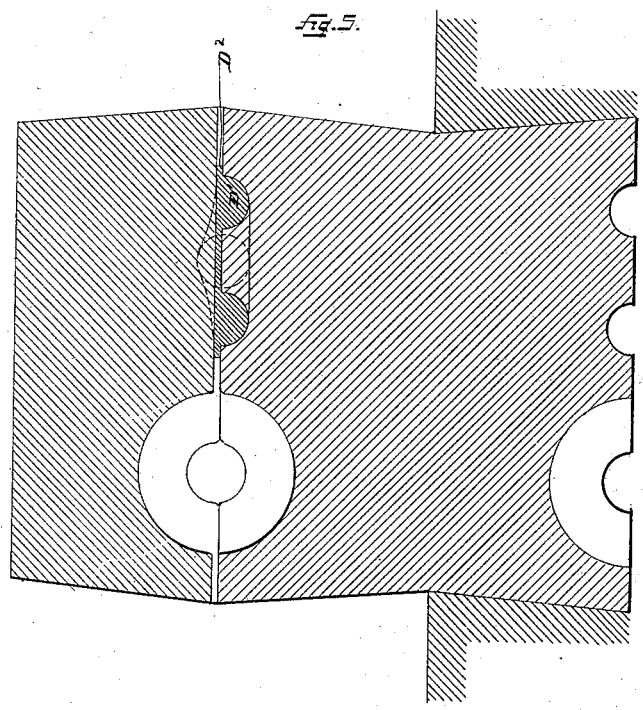
Witnesses:
W. W. Mortimer
H. J. Ryley
Inventor:
Augustin O. David,
by R. S. Dyrenforth,
his Attorney (No Model.) 6 Sheets—Sheet 3.
A. O. DAVID.
MANUFACTURE OF WELDLESS CHAINS.
No. 335,899. Patented Feb. 9, 1886.
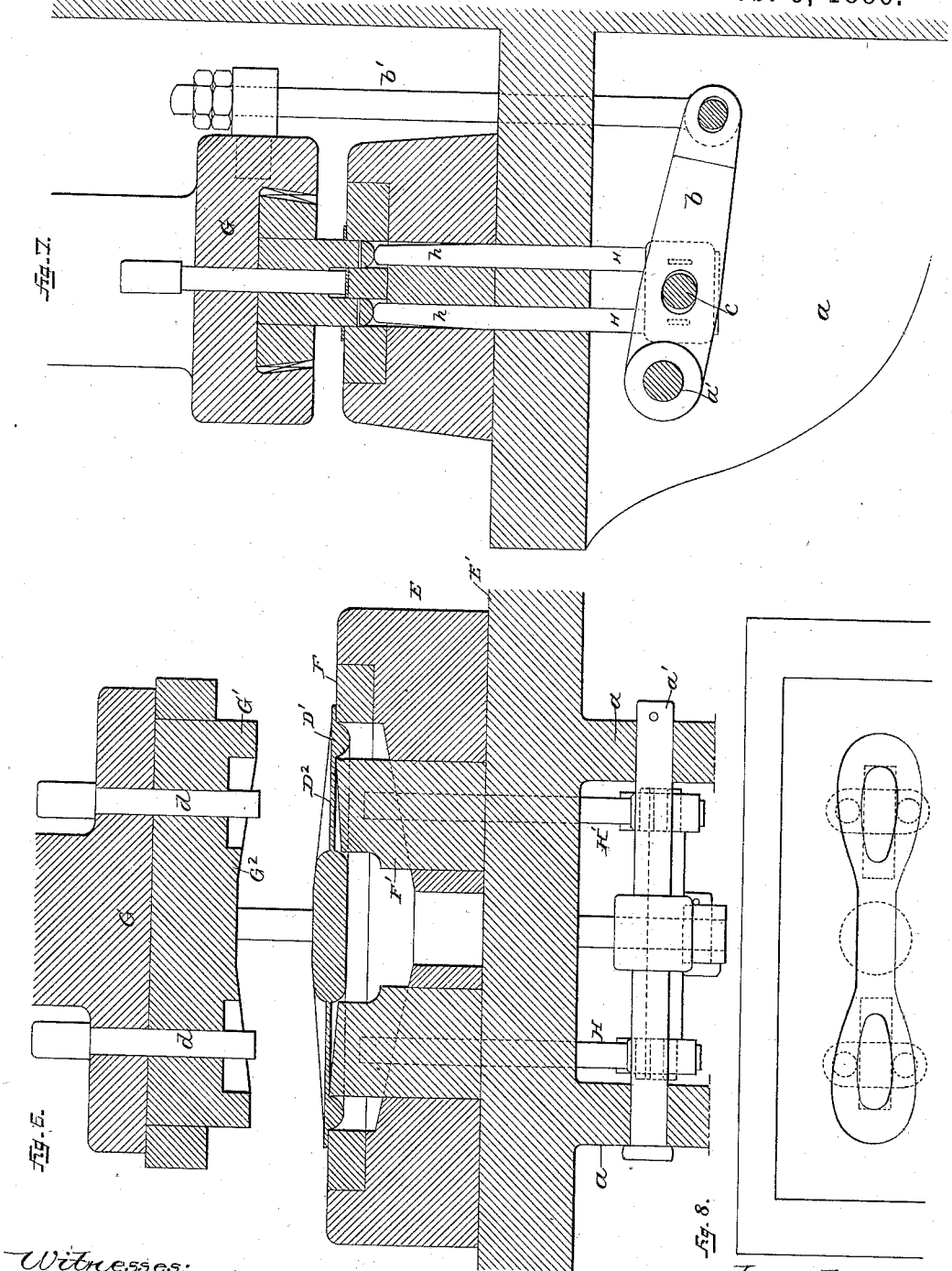
Witnesses:
W. N. Mortimer
H. F. Riley
Inventor:
Augustin O. David,
by R. S. Dyrenforth,
his Attorney (No Model.)
A. O. DAVID.
MANUFACTURE OF WELDLESS CHAINS.
No. 335,899. Patented Feb. 9, 1886.
6 Sheets—Sheet 4.
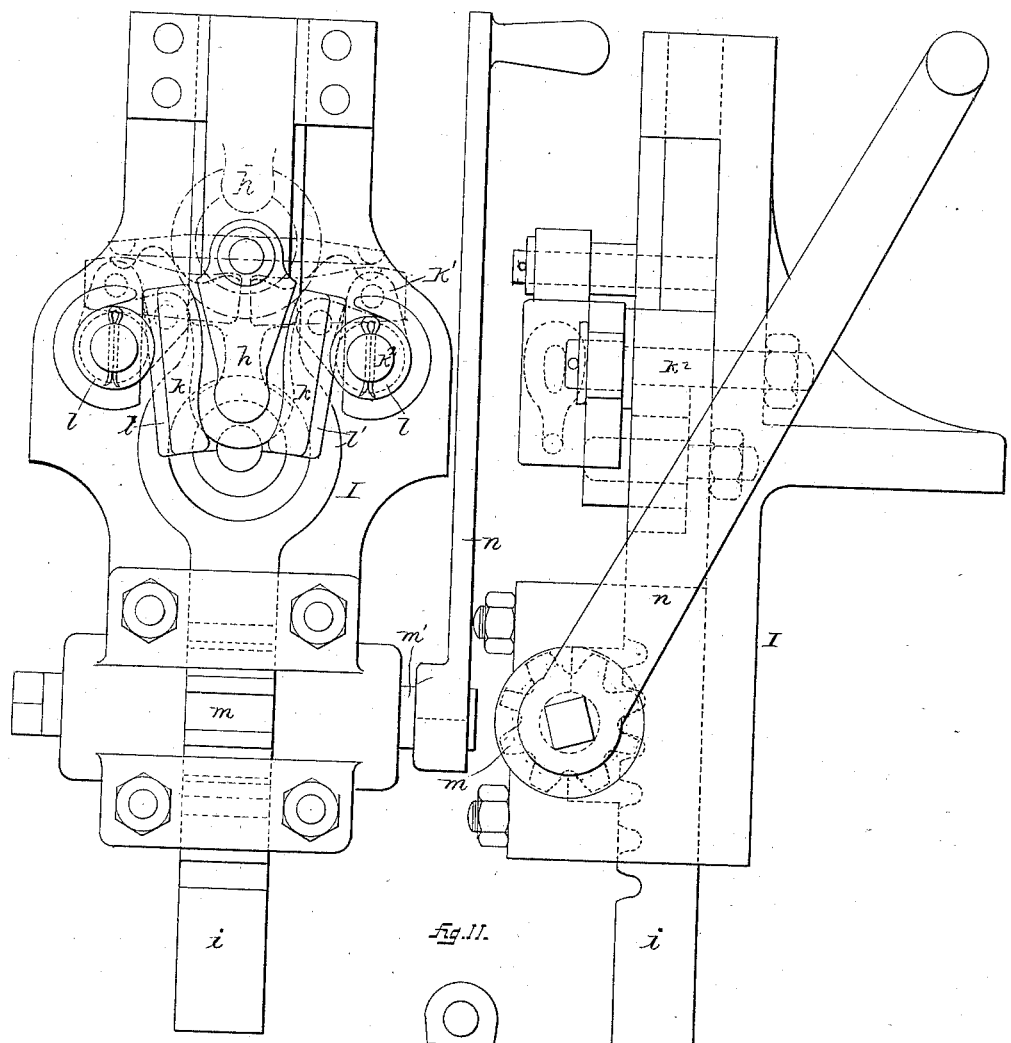
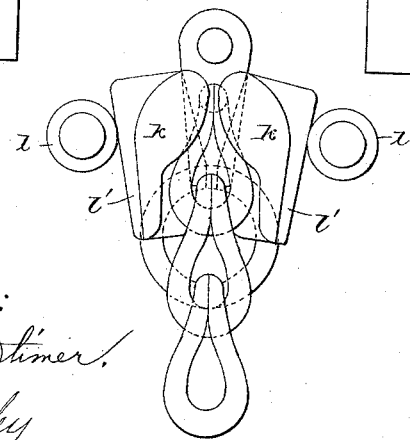
Witnesses:
W. W. Mortimer
H. F. Riley
Inventor:
Augustin O. David
by R. C. Dyrenforth,
his Attorney (No Model.)
6 Sheets—Sheet 5.
A. O. DAVID.
MANUFACTURE OF WELDLESS CHAINS.
No. 335,899. Patented Feb. 9, 1886.
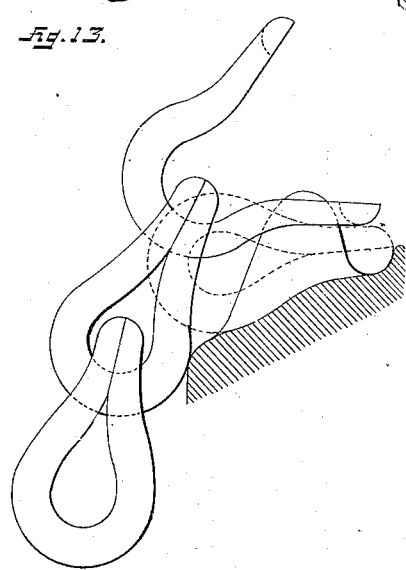
Fig. 13.
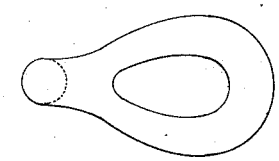
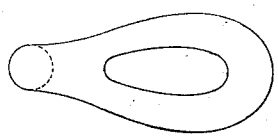
Fig. 12.
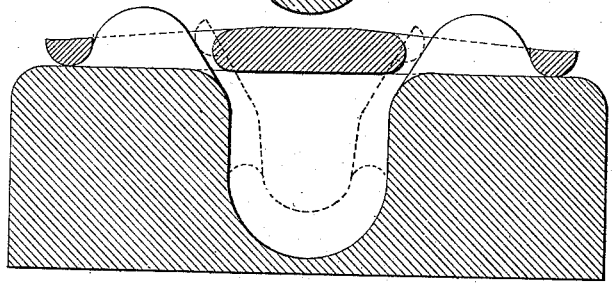
Witnesses:
W. K. Mortimer
H. T. Riley
Inventor:
Augustin O. David,
by R. G. Dyrenforth,
his Attorney
N. PETERS, Photo-Lithographer, Washington, D. C.

(No Model.)  6 Sheets—Sheet 6.
A. O. DAVID.
MANUFACTURE OF WELDLESS CHAINS.
No. 335,899. Patented Feb. 9, 1886.
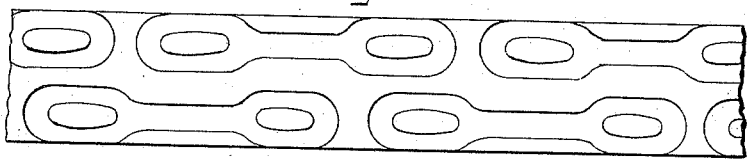
Fig. 14.
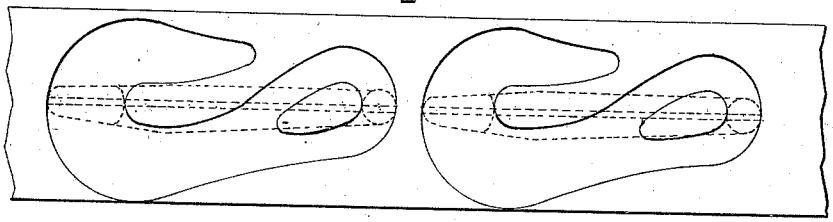
Fig. 17.
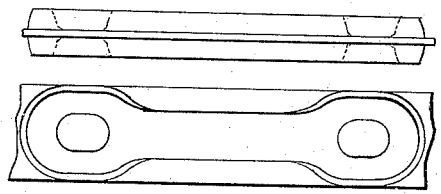
Fig. 15.
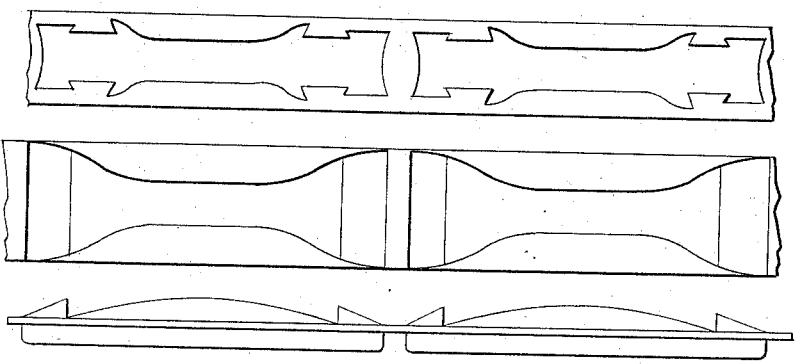
Fig. 16.
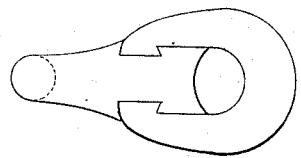
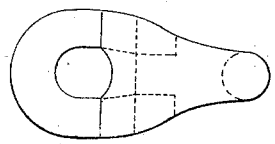
Witnesses:
W. N. Mortimer
H. F. Riley
Inventor.
Augustin O. David
by R. J. Dyrenforth,
his Attorney

UNITED STATES PATENT OFFICE.

AUGUSTIN O. DAVID, OF PARIS, FRANCE, ASSIGNOR TO EUGENE MIANNAY, OF ELIZABETH, NEW JERSEY.

MANUFACTURE OF WELDLESS CHAINS.

SPECIFICATION forming part of Letters Patent No. 335,899, dated February 9, 1886.

Application filed October 13, 1885. Serial No. 179,741. (No model.)

*To all whom it may concern:*

Be it known that I, AUGUSTIN O. DAVID, a citizen of the Republic of France, residing at Paris, France, have invented certain new and useful Improvements in the Manufacture of Weldless Chains; and I do hereby declare the following to be a full, clear, and exact description of the invention, such as will enable others skilled in the art to which it appertains to make and use the same.

My invention relates to the manufacture of that class of chains known as "weldless chains"—that is, chains in which the links are united to form the chain without the necessity of welding each individual link.

The object of my present invention is to simplify and cheapen the manufacture of chains of the weldless class, whether they are to be large or small, plain, or ornamental; and to these ends the invention consists in an improved method of making chains, involving three steps, which may be briefly stated as follows: first, forming link-blanks in a strip of metal, the said blanks being surrounded in the strip by a connecting-web of metal thinner than that portion which is to form the link; second, removing the web; third, bending and folding the links to form the chain.

I will now proceed to describe in full the details of my invention, which, in connection with the accompanying drawings, will enable others to understand and practice the same.

In said drawings like letters or marks of reference indicate corresponding parts.

Figure 1 is a front elevation of crown-rolls for forming the link-blanks in a strip of metal. Fig. 2 is a vertical section of the same on the line *x x* of Fig. 1, this figure also showing in section a bar or link-blank strip after it has passed partly through the rolls. Fig. 3 shows a top plan view of the bar thus treated. Figs. 4 and 5 illustrate stamping-dies for forming a similar link-blank strip. Fig. 6 illustrates a vertical longitudinal section of the cutting-dies for removing the web from the link-blanks. Fig. 7 is a vertical transverse section of these dies. Fig. 8 is a top plan view of the lower or female die with a blank in place thereon. Fig. 9 illustrates in front elevation means for bending links in the operation of uniting them to form a chain. Fig. 10 is a side view in elevation of the same. Fig. 11 illustrates a form of clamping-jaws and former for bending a link complete at one operation. Figs. 12 and 13 illustrate dies for bending and uniting links. Figs. 14, 15, 16, and 17 show the different ways in which strips may be rolled or stamped to form blanks for making links, hooks, &c.

The letter A designates the housing or frame in which the axles or shafts B are mounted to revolve. These two axles or shafts are fitted with meshing pinions or gears $f f$, so that they will revolve simultaneously, and with crown-rolls C, the lower one of which bears the impress for the whole or a portion of the blanks, the upper being suitably formed to make, in connection with the described lower roll, the complete outline for the blank. These crowns C are removable from the shafts, and for this purpose they are adapted by means of the key *e* or otherwise to be removably secured thereto in order that blanks for different designs of links, &c., may be substituted.

The letters $e'\ e'$ in Fig. 1 represent screw-nuts for adjusting or securing the crown longitudinally upon the shafts.

D represents a flat bar of metal after it has passed partially through the rolls, showing how the blanks are formed and held together by the web, which remains around the side of the embyro link in the eyes thereof, and connects the adjacent links in order to hold the blank in convenient form for handling.

The letter D' represents the link-blank, and D² the web.

The forging or stamping dies illustrated in Figs. 4 and 5 are also capable of forming the link-blanks with webs in a strip or sheet of metal.

The operation of forging is so common that no description here would seem necessary.

The cutting or severing of the webs from the link-blanks is effected preferably and most readily by a cutting-machine with dies or cutters constructed substantially as will be now explained.

In Figs. 6, 7, and 8, in which the cutting mechanism is illustrated, the letter E indicates the matrix-holder, which is supported upon a suitable table or other support, E'. F and F' indicate the matrices. These matrices are shaped to receive the link or other blank having the web, so that when the punch or male cutter G, made with cutters G' and G², having the outline of the link or other thing from which the web is to be removed, descends it will act to force the link-blank D' into the corresponding opening in the lower or female die, and thus sever the blank from the web D². Between brackets $a$ on the under side of table or support E' extends a rod or bar, $a'$, which has fulcrumed to it a lever, $b$, at one of its ends, and having its other end connected with a lug on the movable cutting-die G by means of a rod, $b'$. This lever $b$ supports near its middle point a rod or bar, $c$, which carries at each end rods H H', which move vertically in openings $h$, extending from the spaces into which the blank D' is forced in the operation of severing the web therefrom. By this construction it will be seen that after a link-blank has been forced into the female die the upward movement of the male die will cause, through the rod and lever $b$, a vertical movement of the rods H H', the ends of which, acting against the stripped blank, will force the same out of the opening, when it may be removed for further treatment. The male cutting-die G may be fitted with suitable buffers, $d$, which, when said die descends, will bear against the web and prevent its displacement during the cutting operation. After the link-blanks have been thus treated they may be further finished or the openings of their loops dilated or contracted, when they will be ready for bending and uniting to form a chain.

In Figs. 9 and 10 I have illustrated a machine for bending and uniting links, in which the letter I designates a frame or bracket in which is adapted to slide a flat bar, $i$, having its lower end toothed as a rack-bar. The upper end of the bar is fitted with a former, $h$. The clamping-jaws are pivoted to blocks $k'$, which are secured to and turn upon rods $k^2$, passing through and secured in the frame. Upon the outer ends of these rods are also secured flanged rollers $l$, against which the flanges $l'$ of the clamping jaws or blocks $k$ rest and are guided. The lower or racked end of the bar $i$ is engaged by a pinion or gear, $m$, on shaft $m'$, suitably journaled in the frame and adapted to receive and be turned by the crank-handle $n$. The jaws and former shown in Figs. 9 and 10 are adapted for partially bending the link.

To bend a link in the machine just described, the jaws must be raised to about a horizontal position, which will be accomplished by an upward movement of the bar $i$, in which position the said jaws receive a link-blank, folding side up. The crank is now turned to produce a downward movement of the bar, causing the former $h$ to bear against and bend the link at its middle. The continued downward movement of the bar $i$ will cause clamping-jaws $k\ k$ to press and bend the loops against the former. The link thus bent may be removed after a sufficient upward movement of the bar $i$, when another may be put in position and the operation repeated. After the link has been bent as just described, it is passed through the folded loops of another link, and has its loops folded or clamped together, as seen in Fig. 13, or by other suitable means.

Fig. 11 illustrates a form of clamping-jaws and former, which, in proper connection with the operating mechanism illustrated in Figs. 9 and 10, are adapted to bend and fold a link at a single operation.

Fig. 12 illustrates a form of die by which the same result produced by the machine illustrated in Figs. 9 and 10 can be effected.

It is obvious that the blanks for making various kinds of link, hooks, &c., illustrated in Figs. 14 and 17, inclusive, may be made with the rolls or stamping-dies illustrated in Figs. 1, 2, 3, and 4.

What I claim, and desire to secure by Letters Patent, is—

1. The herein-described method of making weldless chains, consisting in first forming the link-blanks in a strip, bar, or sheet of metal, leaving a web of thinner material surrounding the embryo links, and joining the contiguous ones; second, removing the web, and, third, bending, linking, and folding the chains.

2. The herein-described method of making links, consisting in forming the link-blanks in a strip, bar, or sheet of metal, leaving a thin web surrounding each link and joining contiguous links, removing the web, and bending the links preparatory to linking and folding them, substantially as set forth.

In testimony whereof I affix my signature in presence of two witnesses.

AUGUSTIN O. DAVID.

Witnesses:
 ROBT. M. HOOPER,
 T. TROXTON.